W. A. ALLAN.
ENGINE.
APPLICATION FILED MAY 18, 1916.
1,195,323.
Patented Aug. 22, 1916.
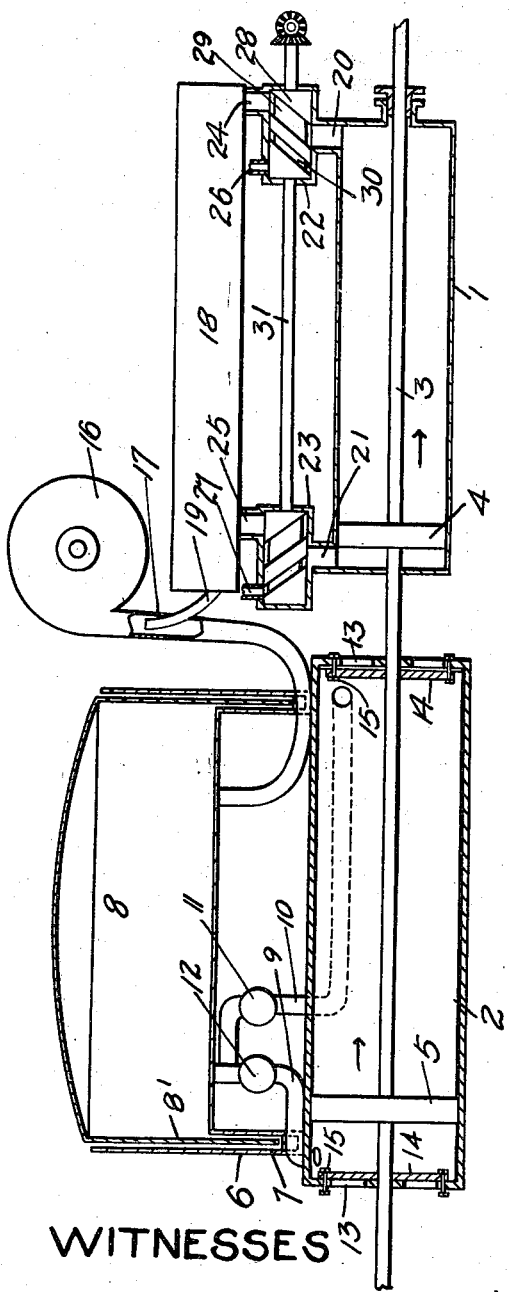
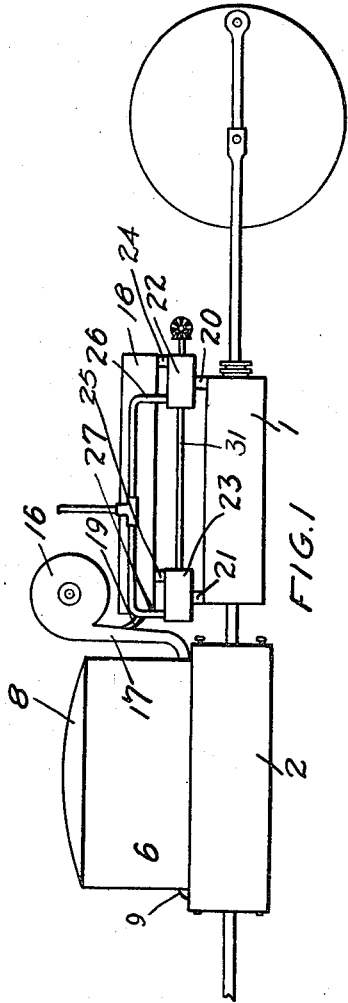
WITNESSES
INVENTOR:
WILLIAM. A. ALLAN.

UNITED STATES PATENT OFFICE.

WILLIAM ALEXANDER ALLAN, OF STOUFFVILLE, ONTARIO, CANADA.

ENGINE.

1,195,323.  Specification of Letters Patent.  Patented Aug. 22, 1916.

Application filed May 18, 1916. Serial No. 98,334.

*To all whom it may concern:*

Be it known that I, WILLIAM ALEXANDER ALLAN, of the village of Stouffville, in the county of York, in the Province of Ontario, Canada, have invented certain new and useful Improvements in Engines, of which the following is the specification.

My invention relates to improvements in engines and the object of the invention is to make available a considerable part of the velocity and heat of the exhaust gas or steam from the engine for the purpose of converting into mechanical power and it consists essentially of an engine cylinder, an air compressor cylinder, a common shaft extending through the engine cylinder and air compressor cylinder, a piston located in each cylinder upon the shaft, a receiving reservoir for the compressed air, an exhaust steam chamber, a turbine casing, an upwardly curved jet pipe extending from the exhaust steam chamber into a duct leading between the air reservoir and the turbine as hereinafter more particularly explained by the following specification.

Figure 1, is a side elevation of my apparatus. Fig. 2, is an enlarged sectional view through Fig. 1.

In the drawings like letters of reference indicate corresponding parts in each figure.

1 indicates the steam cylinder, 2 the air compressor cylinder and 3 the common shaft extending longitudinally through the steam cylinder and air compressor cylinder.

4 indicates the piston head secured to the shaft 3 and located within the steam cylinder 1.

5 indicates a piston head secured on the shaft 3 and located within the air compressor cylinder 2.

6 indicates an air reservoir tank provided with an annular well 7 extending around the bottom of the same and provided with a suitable sealing fluid.

8 indicates a bell, the depending wall 8' of which extends into the sealing fluid contained in the well 7.

9 and 10 indicate ducts leading from the ends of the compressor cylinder 2 into the reservoir 6, such ducts being provided with non-return valves 11 and 12. The heads of the cylinder 2 are provided with openings 13.

14 indicates a covering plate through which the shaft 3 freely extends, such covering plate being secured to the heads of the cylinder 2 by bolts 15 so as to permit of a slight inward and outward movement of the plate 14.

16 indicates the turbine.

17 indicates a duct leading from the reservoir 6 to the turbine casing 16.

18 indicates a reservoir for the exhaust steam.

19 indicates a jet pipe leading from one end of the reservoir 18 into the pipe 17 leading to the turbine, the mouth of such jet being preferably in close proximity to the entrance point of the pipe 17 into the turbine casing.

20 and 21 indicate the exhaust and steam inlet ducts of the engine cylinder 1.

22 and 23 indicate cylindrical valve casings into which the ducts 20 and 21 lead.

24 and 25 indicate exhaust ducts leading from the casings 22 and 23 into the steam reservoir 18.

26 and 27 indicate steam pipes for supplying live steam to the engine. The pipes 26 and 27 enter the valve cylinders 22 and 23 in proximity to the opposite end to the exhaust ducts 24 and 25.

Each valve casing 22 and 23 is provided with a cylindrical valve 28 having inclined annular grooves 29 and 30 formed therein, such ducts being set at such an incline that during rotation they alternately connect the duct 20 with the exhaust duct 24 and the live steam pipe 26 with the duct 20. A similar operation takes place at the opposite end of the cylinder, the exhaust duct 25 being connected with the duct 21 alternately with the live steam pipe 27. The valves 28 are connected together by a shaft 31 which is suitably driven from the crank shaft of the engine.

Having described the principal parts involved in my invention I will briefly describe the operation of the same.

It will be understood that as the piston 4 travels in the direction of arrow the exhaust passes through the duct 20, annular groove 29, duct 24 into the reservoir 18 and from the reservoir 18 through the jet 19 into the pipe 17. Simultaneously the air compressed by the travel of the piston 5 in the direction of arrow passes through the duct 10 into the reservoir 8. Such compressed air passes through the pipe 17 and envelops steam passing from the jet 19 so as to convey it by its velocity into the turbine. It will thus be seen that every particle of exhaust steam is carried from the cylinder 18 into the turbine and is utilized for driving the same. The power thus generated may be transmitted by any suitable means to the main shaft of the engine so as to be auxiliary to the ordinary engine drive. It will thus be seen that there is a power developed by the engine, a power generated by the impact of the air upon the turbine and whatever expansion is left in the exhaust steam or gas acting in unison with the air upon the turbine blades.

What I claim as my invention is:—

1. The combination with an engine cylinder provided with the usual exhaust, of an exhaust reservoir, a jet pipe leading therefrom, a compressed air reservoir, a pipe leading therefrom into which the exhaust jet leads, and a turbine into the casing of which the exhaust pipe enters.

2. In an engine, the combination with the engine cylinder provided with the usual exhaust, an air compressor cylinder operating in unison with the engine cylinder, a compressed air reservoir, ducts for carrying the compressed air from the compressor cylinder into the reservoir, a turbine duct leading from the turbine casing to the compressed air reservoir, an exhaust steam reservoir, and a jet pipe leading from the exhaust steam reservoir into the pipe leading into the turbine casing.

3. The combination with an engine exhaust duct, of a turbine provided with a suitable casing, of a duct leading into the casing into which the exhaust pipe extends, and means for supplying the duct with compressed air.

WILLIAM ALEXANDER ALLAN.

Witnesses:
M. EGAN,
V. LONG.

Copies of this patent may be obtained for five cents each, by addressing the "Commissioner of Patents, Washington, D. C."